United States Patent [19]

Kadoi et al.

[11] Patent Number: 5,654,358
[45] Date of Patent: Aug. 5, 1997

[54] POLYPHENYLENE SULFIDE COMPOSITION AND SHAPED ARTICLES MADE THEREFROM

[75] Inventors: Sho Kadoi, Chiba; Norio Shimasaki; Kazuhiko Kobayashi, both of Aichi; Katuya Ohno, Gifu, all of Japan

[73] Assignee: Toray Industries, Inc., Japan

[21] Appl. No.: 475,793

[22] Filed: Jun. 7, 1995

Related U.S. Application Data

[62] Division of Ser. No. 410,938, Mar. 27, 1995, which is a continuation of Ser. No. 185,764, Jan. 24, 1994, abandoned, which is a continuation of Ser. No. 991,085, Dec. 14, 1992, abandoned, which is a continuation of Ser. No. 625,643, Dec. 7, 1990, abandoned, which is a continuation-in-part of Ser. No. 359,133, May 31, 1989, abandoned.

[30] Foreign Application Priority Data

Jun. 2, 1988 [JP] Japan .................. 63-136288
Feb. 13, 1990 [JP] Japan .................... 2-33148

[51] Int. Cl.⁶ ............................................. C08L 53/00
[52] U.S. Cl. .................. 524/505; 525/57; 525/191; 525/212; 525/217; 525/218; 525/221; 525/227
[58] Field of Search .................. 524/505; 525/57, 525/191, 212, 217, 218, 221, 222

[56] References Cited

U.S. PATENT DOCUMENTS 4,581,411 4/1986 Liang et al. .................. 525/189
4,748,169 5/1988 Izutsu et al. .................. 524/500
4,889,893 12/1989 Kobayashi et al. .................. 525/189

FOREIGN PATENT DOCUMENTS

| 0345094 | 12/1989 | European Pat. Off. . |
|---|---|---|
| 55-156342 | 12/1980 | Japan . |
| 58-40350 | 3/1983 | Japan . |
| 58-152019 | 9/1983 | Japan . |
| 58-154757 | 9/1983 | Japan . |
| 59-113055 | 6/1984 | Japan . |
| 59-152953 | 8/1984 | Japan . |
| 59-189166 | 10/1984 | Japan . |
| 61-53356 | 3/1986 | Japan . |
| 62-153345 | 7/1987 | Japan . |
| 62-169854 | 7/1987 | Japan . |
| 62-232437 | 10/1987 | Japan . |
| 1335385 | 10/1973 | United Kingdom . |

*Primary Examiner*—Edward J. Cain
*Attorney, Agent, or Firm*—Austin R. Miller

[57] ABSTRACT

Disclosed are a polyphenylene sulfide composition having excellent impact characteristics, melt flow characteristics and flexibility which comprises, as indispensable components, (A) a polyphenylene sulfide, (B) an epoxy group-containing olefinic polymer, and (C) at least one elastomer selected from ethylene/propylene copolymers, ethylene/butene copolymers, ethylene/propylene/diene copolymers, hydrogenated styrene/butadiene/styrene block copolymers, copolymers of ethylene with a monomer selected from acrylic acid, methacrylic acid and alkyl esters and metal salts thereof, and polyamide elastomers; and a shaped article made from the polyphenylene sulfide composition.

12 Claims, No Drawings

POLYPHENYLENE SULFIDE COMPOSITION AND SHAPED ARTICLES MADE THEREFROM

This application is a division of U.S. Ser. No. 08/410,938 filed Mar. 27, 1995, now pending which is a continuation of U.S. Ser. No. 08/185,764 filed Jan. 24, 1994, now abandoned, which is a continuation of U.S. Ser. No. 07/991,085 filed Dec. 14, 1992, now abandoned, which is a continuation of U.S. Ser. No. 07/625,643 filed Dec. 7, 1990, now abandoned, which is a continuation in part of U.S. Ser. No. 07/359,133 filed May 31, 1989, now abandoned.

BACKGROUND OF THE INVENTION

(1) Field of the Invention

The present invention relates to a polyphenylene sulfide (hereinafter referred to as "PPS") composition having excellent impact characteristics, melt flowability and flexibility, and a shaped article made therefrom.

(2) Description of the Related Art

As the polyphenylene sulfide resin having improved impact characteristics, there can be mentioned a composition prepared by incorporating into PPS an appropriate amount of an epoxy group-containing $\alpha$-olefinic copolymer comprising an $\alpha$-olefin and a glycidyl ester of an $\alpha,\beta$-unsaturated acid, as proposed in Japanese Unexamined Patent Publication No. 58-154757, and a composition prepared by incorporating an appropriate amount of an $\alpha$-olefinic copolymer comprising an $\alpha$-olefin and a glycidyl ester of an $\alpha,\beta$-unsaturated acid into a polyphenylene sulfide which has been subjected to a specific treatment, as disclosed in Japanese Unexamined Patent Publication No. 62-153343, Japanese Unexamined Patent Publication No. 62-153344 and Japanese Unexamined Patent Publication No. 62-153345.

Compositions prepared by incorporating various elastomers into PPS are disclosed in Japanese Unexamined Patent Publication No. 60-120753, Japanese Unexamined Patent Publication No. 59-113055, Japanese Unexamined Patent Publication No. 58-27740, Japanese Unexamined Patent Publication No. 56-118456 and Japanese Unexamined Patent Publication No. 56-118449.

Among the foregoing known compositions, none of the compositions comprising elastomers provides a satisfactory improvement of the impact characteristics. As is well-known, the molecule chain of polyphenylene sulfide is relatively inactive, and therefore, if any ordinary elastomer is merely incorporated in polyphenylene sulfide, since the affinity of the elastomer with polyphenylene sulfide is poor, satisfactory impact characteristics cannot be obtained.

In the composition prepared by incorporating an olefinic copolymer comprising an $\alpha$-olefin and a glycidyl ester of an $\alpha,\beta$-unsaturated acid into polyphenylene sulfide, the impact characteristics are improved, and where this olefinic copolymer is incorporated in polyphenylene sulfide which has been subjected to a specific deionizing treatment, the impact characteristics are remarkably improved. Nevertheless, when this olefinic copolymer comprising an $\alpha$-olefin and a glycidyl ester of an $\alpha,\beta$-unsaturated acid is incorporated, the melt viscosity of PPS rises, and a serious problem arises of a reduction of the moldability inherently possessed by PPS, and a poor flexibility of the composition.

SUMMARY OF THE INVENTION

Therefore, a primary object of the present invention is to provide a PPS composition in which the impact characteristics are superior to those of the conventional compositions, and which has an excellent moldability, represented by the flowability, and an excellent flexibility.

Another object of the present invention is to provide a shaped article made by melt-shaping the above-mentioned PPS composition.

In accordance with the present invention, there is provided a polyphenylene sulfide composition comprising (A) a polyphenylene sulfide, (B) an epoxy group-containing olefinic polymer and (C) at least one elastomer selected from the group consisting of polyamide elastomers, ethylene/propylene copolymers, ethylene/butene copolymers, ethylene/propylene/diene terpolymers, hydrogenated styrene/butadiene/styrene copolymers, and copolymers of ethylene with a monomer selected from the group consisting of acrylic acid, alkyl esters of acrylic acid, metal salts of acrylic acid, methacrylic acid, alkyl esters of methacrylic acid and metal salts of methacrylic acid. The polyamide elastomers are block copolymers having hard segments of a polyamide component and soft segments of at least one component selected from the group consisting of polyether components and polyester components.

DESCRIPTION OF THE PREFERRED EMBODIMENTS

The polyphenylene sulfide (PPS) used in the present invention is a polymer comprising at least 70 mole %, preferably at least 90 mole %, of recurring units represented by the structural formula

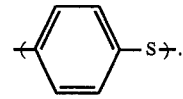

If the content of the above-mentioned recurring units is lower than 70 mole %, the heat resistance is poor.

The PPS generally includes a polymer having a relatively low molecular weight, which is typically prepared by the process disclosed in U.S. Pat. No. 3,354,129, and a polymer having a relatively high molecular weight, which is typically prepared by the process disclosed in U.S. Pat. No. 3,919,177. The polymerization degree of the polymer obtained by the process disclosed in U.S. Pat. No. 3,354,129 can be increased by heating the polymer in an oxygen atmosphere after the polymerization or heating the polymer in the presence of a crosslinking agent such as a peroxide. Any of the PPS prepared according to the known processes can be used in the present invention, but a substantially linear polymer having a relatively high molecular weight, which is typically prepared according to the process disclosed in U.S. Pat. No. 3,919,177, is preferable because the effects of the present invention are conspicuous and the toughness of the PPS per se is excellent.

The PPS used in the present invention can comprise up to 30 mole % of recurring units represented by any of the following structural formulae:

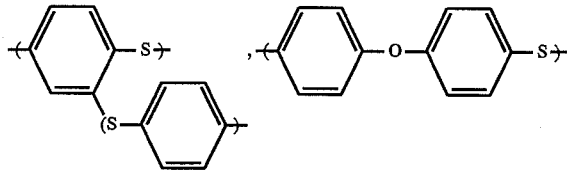

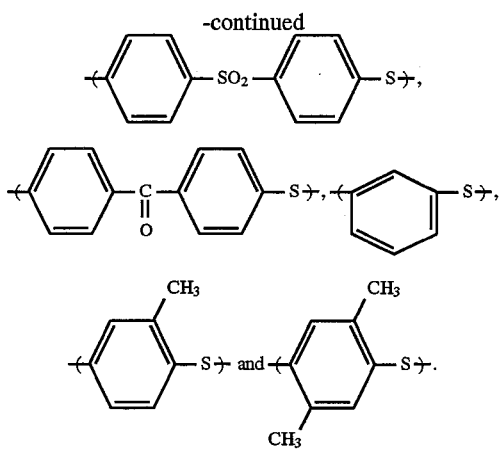

As described above, the kind of PPS used in the present invention is not particularly critical, but in view of the affinity with an olefinic copolymer described hereinafter, preferably PPS which has been subjected to a deionizing purification treatment to remove ionic species is used. The effects of the present invention can be obtained if the ion content of PPS expressed as the sodium content is not larger than 900 ppm, preferably not larger than 500 ppm. As the effective means for reducing the sodium content, there can be mentioned (a) an acid treatment, (b) a hot water treatment, and (c) an organic solvent washing treatment.

These preferred deionizing purification treatments of PPS will now be described.

The acid treatment is carried out in the following manner. The PPS is dipped in an acid or an aqueous solution of an acid, and if necessary, stirring or heating appropriately performed. For example, where acetic acid is used, a powdery PPS is immersed in an aqueous solution having a pH value of 4, which is heated at 80° to 90° C., and a required effect can be obtained if stirring is conducted for 30 minutes. To remove the residual acid or salt, the acid-treated PPS must be washed with water or warm water.

To avoid a lowering of the effect of the preferred chemical modification of the PPS obtained by the acid treatment, preferably distilled water or deionized water is used for the washing.

The hot water treatment is carried out in the following manner. To obtain the effect of the chemical modification at the hot water treatment, preferably the temperature of the hot water is at least 100° C., more preferably at least 120° C., most preferably higher than 150° C., and especially preferably higher than 170° C.

To avoid a lowering of the effect of the preferred chemical modification of the PPS obtained by the hot water washing, preferably distilled water or deionized water is used for the hot water washing. In general, the hot water treatment is conducted by adding a predetermined amount of the PPS to a predetermined amount of water and heating the thus-prepared mixture under stirring in a pressure vessel. A large proportion of water to PPS is preferred, and in general, a bath ratio of not larger than 200 g of PPS per liter of water is selected.

Since deterioration of the polymer is not preferable, the treatment is preferably carried out in an inert atmosphere to avoid such deterioration of the polymer. To remove the residual components, preferably the PPS which has been subjected to the hot water treatment at a temperature of at least 100° C. is washed several times with water. Maintained at a temperature of lower than 100° C., more preferably at a temperature of at least 10° C. but lower than 100° C.

Any organic solvents not having an action of decomposing PPS can be used for washing PPS. For example, there can be mentioned nitrogen-containing polar solvents such as N-methylpyrrolidone, dimethylformamide, dimethylacetamide, 1,3-dimethylimidazolidinone, hexamethylphosphoramide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Of these organic solvents, N-methylpyrrolidone, acetone, dimethylformamide and chloroform are especially preferred. Further, these solvents can be used alone or as a mixture of two or more thereof.

The washing with the organic solvent is accomplished by immersing PPS in the organic solvent and heating or stirring as appropriate, if necessary. The washing temperature for the organic solvent washing is not particularly critical, and an optional temperature can be selected of from room temperature to about 300° C. The washing efficiency is increased with an elevation of the washing temperature, but in general, a satisfactory effect is obtained at a washing temperature of from room temperature to 150° C.

Further, the washing can be carried out under pressure at a temperature higher than the boiling point of the organic solvent in a pressure vessel. The washing time is not particularly critical, and for a batchwise washing, a satisfactory effect is generally obtained if the washing is conducted for at least 5 minutes. Alternatively, the washing can be performed in a continuous manner.

Only the organic solvent washing of the PPS obtained by the polymerization is satisfactory, but to further enhance the effects of the present invention, preferably the organic solvent washing is combined with the water washing or warm water washing. When a high-boiling-point organic solvent such as N-methylpyrrolidone is used, the residual organic solvent can be easily removed by washing with water or warm water after the organic solvent washing, and preferably distilled water or deionized water is used for this washing.

In the present invention, a satisfactory effect can be obtained by carrying out the above-mentioned acid treatment or hot water treatment alone, but a method can be adopted in which the acid treatment is first carried out and the hot water treatment is carried out thereafter, or a method can be adopted in which the hot water treatment is first carried out and then the acid treatment is carried out.

Usual additives such as an antioxidant, a heat stabilizer, a lubricant, a crystal nucleating agent, an ultraviolet absorber and a colorant and a minor amount of other polymer can be added to the PPS used in the present invention, as long as the effects of the present invention still can be obtained. To control the degree of crosslinking in PPS, a usual peroxide, a crosslinking promoter such as a metal salt of thiophosphinic acid disclosed in U.S. Pat. No. 4,421,910, or a cross-linking-preventing agent such as a dialkyltin dicarboxylate or aminotriazole disclosed in U.S. Pat. No. 4,434,122 and U.S. Pat. No. 4,411,853 can be added.

The epoxy group-containing olefinic polymer (B) used in the present invention is an olefinic polymer having an epoxy group in the side chain or main chain, and usual epoxy resins are not included. As the epoxy group-containing olefinic polymer, there can be mentioned olefinic polymers having a glycidyl group such as a glycidyl ester, a glycidyl ether or a glycidyl amine in the side chain, and olefinic polymers having a double bond epoxy-oxidized. Of these epoxy group-containing olefinic polymers, a copolymer of an α-olefin with a glycidyl ester of an α,β-unsaturated acid is preferably used in the present invention. As the α-olefin, there can be mentioned ethylene, propylene and butene-1. The glycidyl ester of the α,β-unsaturated acid is represented by the following formula:

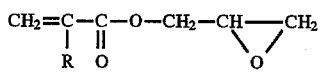

wherein R stands for a hydrogen atom or a lower alkyl group having 1 to 5 carbon atoms.

As specific examples, there can be mentioned glycidyl acrylate, glycidyl methacrylate and glycidyl ethacrylate. The content of the epoxy group in the epoxy group-containing olefinic polymer (B) is preferably 0.1 to 30% by weight, especially 0.2 to 10% by weight. If the content of the epoxy group is lower than 0.1% by weight, the desired effects cannot be obtained, and if the content of the epoxy group exceeds 30% by weight, gelation occurs at the melt kneading with PPS and the extrusion stability, moldability and mechanical characteristics are worsened.

A minor amount of another olefinic monomer such as methyl acrylate, methyl methacrylate, acrylonitrile, styrene, vinyl acetate or vinyl ether can be copolymerized with the epoxy group-containing olefinic polymer (B) used in the present invention, as long as the effects of the present invention still can be obtained.

As described above, the impact characteristics can be improved in a PPS composition prepared by incorporating the epoxy group-containing olefinic polymer (B) in PPS, but this composition has a problem in that the melt viscosity is lowered and the flexibility is at an unsatisfactory level.

In the present invention, therefore, to improve the impact characteristics and enhance the melt flowability and flexibility, an elastomer (C) is incorporated as an indispensable component into PPS, together with the above-mentioned component (B).

The elastomer (C) used in the present invention preferably does not include an epoxy group and an acid anhydride group and has a flexural modulus not larger than 10,000 kgf/cm². The use of an elastomer containing an acid anhydride group is not preferred because the elastomer raises the melt viscosity of the composition and reduces the moldability of the composition.

The elastomer (C) to be used in the present invention is at least one member selected from ethylene/propylene copolymers, ethylene/butene copolymers, ethylene/propylene/diene copolymers, hydrogenated styrene/butadiene/styrene block copolymers, copolymers of ethylene with acrylic acid, methacrylic acid or alkyl esters or metal salts thereof, and polyamide elastomers. When elastomers other than the above-mentioned elastomers, such as a butadiene/styrene copolymer, a butadiene/acrylonitrile copolymer, polybutadiene, an ethylene/vinyl acetate copolymer and plasticized polyvinyl chloride are used, the effects of the present invention cannot be obtained.

The ethylene/propylene copolymer is a copolymer of ethylene and propylene having a melt flow index of 0.1 to 50 g/10 min as determined according to JIS K-7210, and preferably the ethylene content is 30 to 95% by weight, more preferably 40 to 90% by weight.

The ethylene/butene copolymer is a copolymer of ethylene and butene-1 having a melt index of 0.5 to 50 g/10 min as determined according to JIS K-7210, and preferably the ethylene content is 30 to 95% by weight, more preferably 40 to 90% by weight.

The ethylene/propylene/diene copolymer is a copolymer prepared by introducing a diene compound into an ethylene/propylene copolymer, and the iodine value as the factor indicating the quantity introduced of the diene compound is generally 5 to 30. As the diene compound to be introduced, there can be mentioned hexadiene, norbornadiene, and ethylidene norbornene.

The hydrogenated styrene/butadiene/styrene block copolymer is a copolymer obtained by hydrogenating a part or all of the intermediate butadiene blocks of a styrene/butadiene/styrene copolymer elastomer, for example, according to the process disclosed in the specification of U.S. Pat. No. 3,413,323. The melt flow index of the copolymer is 0.5 to 100 g/10 min, as determined according to JIS K-7210, and the styrene content is preferably 5 to 60 mole %, more preferably 10 to 50 mole %.

As the copolymers of ethylene with acrylic acid, methacrylic acid, and alkyl esters in which the alkyl group has 1 to 5 carbon atoms, and metal salts thereof, there can be mentioned ethylene/acrylic acid ester copolymers such as an ethylene/methyl acrylate copolymer, an ethylene/ethyl acrylate copolymer, an ethylene/propyl acrylate copolymer and an ethylene/butyl acrylate copolymer, ethylene/methacrylic acid ester copolymers such as an ethylene/methyl methacrylate copolymer, an ethylene/ethyl methacrylate copolymer, an ethylene/propyl methacrylate copolymer, and an ethylene/butyl methacrylate copolymer, an ethylene/acrylic acid copolymer and an ethylene/methacrylic acid copolymer, and their metal salts such as Na, Zn, K, Ca and Mg salts.

The polyamide elastomer is a block copolymer elastomer having hard segments of a polyamide component and soft segments of a polyether component and/or a polyester component. As the polyamide component, there can be mentioned $-(NH-R^{I}-CO)_{\overline{n}}$ and $-(NH-R^{II}-NHCO-R^{III}-CO)_{\overline{n}}$ (in which $R^{I}$, $R^{II}$ and $R^{III}$ stand for an alkylene group having 2 to 15 carbon atoms or a substitution product thereof). As the polyether component, there can be mentioned $-(OR)_{\overline{n}}$ (in which R stands for an alkylene group having 2 to 15 carbon atoms or a substitution product thereof), and as the polyester component, there can be mentioned $-(OR^{I}-CO)_{\overline{n}}$ and $-(O-R^{II}-OCO-R^{III}-CO)_{\overline{n}}$ (in which $R^{I}$, $R^{II}$ and $R^{III}$ stand for an alkylene group having 2 to 15 carbon atoms or a substitution product thereof). The polyamide elastomer further includes random copolymers of nylon 6, nylon 66, nylon 610, nylon 11 and nylon 12.

Of the foregoing elastomers (C), an ethylene/propylene copolymer, an ethylene/butene copolymer, an ethylene/acrylic acid copolymer, an ethylene/methacrylic acid copolymer, an ethylene/an alkyl acrylate copolymer, and an ethylene/an alkyl methacrylate copolymer are preferable.

The mixing ratio among the PPS (A), the epoxy group-containing olefinic copolymer (B), and the elastomer (C) is preferably within a range such that the (A)/[(B)+(C)] weight ratio is from 55/45 to 99/1, more preferably from 70/30 to 95/5, and the (B)/(C) weight ratio is from 95/5 to 5/95, more preferably from 80/20 to 10/90. If the ratio of the component (A) is lower than 55% by weight, the strength and rigidity of the composition are lowered, and if the ratio of the component (C) based on the sum of the components (B) and (C) is lower than 5% by weight, there is little improvement of the melt flowability.

In the present invention, a fibrous reinforcer and/or a granular reinforcer can be incorporated in an amount of up to 400 parts by weight per 100 parts by weight of the sum of the PPS (A), the epoxy group-containing olefinic polymer (B) and the elastomer (C) according to need, although the reinforcer is not an indispensable component. If the reinforcer is incorporated in an amount of 10 to 300 parts by weight, the strength, rigidity, heat resistance, and dimensional stability can be improved.

As the fibrous reinforcer, there can be mentioned inorganic fibers such as a glass fiber, an alumina fiber, a silicon carbide fiber, a ceramic fiber, an asbestos fiber, a gypsum fiber and a metal fiber, and a carbon fiber.

As the granular reinforcer, there can be mentioned silicates such as wollastonite, sericite, kaolin, mica, clay, bentonite, asbestos, talc and alumina silicate, metal oxides such as alumina, silicon oxide, magnesium oxide, zirconium oxide and titanium oxide, carbonates such as calcium carbonate, magnesium carbonate and dolomite, sulfates such as calcium sulfate and barium sulfate, and glass beads, boron nitride, silicon carbide and silica. These reinforcers may have a hollow structure. A mixture of two or more of these reinforcers can be used, and these reinforcers can be preliminarily treated with a silane coupling agent or titanium coupling agent if necessary.

The means for preparing the composition of the present invention is not particularly critical, and as a typical example, there can be mentioned a method in which the PPS (A), the epoxy group-containing olefinic polymer (B), and the elastomer (C), if necessary with the reinforcer, are melt-kneaded at a temperature higher than the melting point of the PPS in an extruder, and the resulting kneaded mixture is pelletized.

In general, preferably the melt-kneading temperature is higher than 280° C., to sufficiently melt the composition, and lower than 340° C. to prevent a thermal deterioration and gelation of the olefinic copolymer (B). Namely, preferably the melt-kneading temperature is 280° to 340° C.

The PPS composition of the present invention pelletized by the above-mentioned melt-kneading can be shaped into various shaped articles having excellent impact characteristics and flexibility by various molding methods such as injection molding, extrusion molding, compression molding, transfer molding and blow forming. In particular, the PPS composition of the present invention can be extrusion-molded into a tubular article, a sheet-form article and other shaped articles. The tubular article has a high heat resistance, high chemical resistance and high gas-barrier property and has an excellent flexibility and impact resistance. Therefore, this tubular article is preferable for use as a pressure hose such as an oil hydraulic hose or a hydraulic hose, a vacuum hose, a cooler conduit hose, a fuel line tube or brake tube used in the field of automobiles, or as a liner for a control cable.

When preparing a tubular article as mentioned above from the composition of the present invention, preferably the extrusion molding is carried out under conditions such that the melt extrusion temperature is 280° to 350° C. and the shear rate of the polymer extruded from the top end of the extruder is 0.1 to 100 $sec^{-1}$.

The PPS composition of the present invention exhibits an excellent blow-forming property and the drawdown of a parison thereof is small, and the blow-formed hollow articles have good surface appearance, thermal resistance, chemical resistance and impact resistance, and are of a high utility. In particular, a blend comprised of 100 parts by weight of the PPS composition of the present invention and 10 to 100 parts by weight of an inorganic reinforcer such as a glass fiber and having an apparent melt viscosity of at least 20,000 poise at a temperature of 320° C. and a shear rate of 10 $sec^{-1}$ is suitable for blow-forming. Various blow-forming methods can be employed which include, for example, a direct blow-forming method, an accumulated blow-forming method, a multi-dimensional blow-forming method, an exchange blow-forming method and a laminating blow-forming method. The thus-blow-formed articles which are in the form of, for example, a bottle, a tank and a duct are used, for example, for chemical containers, air-conditioning ducts, ducts and pipes in an automobile engine room.

The present invention will now be described in detail with reference to the following examples that by no means limit the scope of the invention.

REFERENTIAL EXAMPLE 1

(polymerization for preparation of PPS)

An autoclave was charged with 3.26 kg (25 moles) of sodium sulfide (containing 40% of crystallization water), 4 g of sodium hydroxide, 1.36 kg (about 10 moles) of sodium acetate trihydrate and 7.9 kg of N-methyl-2-pyrrolidone (hereinafter referred to as "NMP"), and the temperature was gradually elevated to 205° C. while stirring to remove about 1.5 l of a distilled liquid containing about 1.36 kg of water. Then 3.75 kg (25.5 moles) of 1,4-dichlorobenzene and 2 kg of NMP were added to the residual mixture, and the mixture was heated at 265° C. for 4 hours. The reaction product was washed five times with water maintained at 70° C., and dried under a reduced pressure at 80° C. for 24 hours to obtain about 2 kg of powdery PPS having a melt viscosity of about 2,500 poise (as determined at 320° C. and a shear rate of 1,000 $sec^{-1}$).

The powdery PPS prepared in the above-mentioned manner was used in the following examples.

EXAMPLE 1

About 2 kg of the PPS powder obtained in Referential Example 1 was added to 20 l of an aqueous solution of acetic acid having a pH value of 4 and heated at 90° C., and stirring was conducted for about 30 minutes, followed by filtration. Washing with deionized water maintained at about 90° C. was conducted until the pH value of the filtrate became 7, and drying under a reduced pressure was conducted at 120° C. for 24 hours to obtain a powder.

This powder, an ethylene/glycidyl methacrylate (88/12 weight ratio) copolymer and an ethylene/propylene copolymer (Tafmer-P 180 supplied by Mitsui Petrochemical), was dry-blended at a weight ratio of 80/10/10, and the blend was melt-kneaded and pelletized by a screw extruder set at 290° to 310° C. The melt viscosity of the obtained pellet was measured (at 320° C. and a shear rate of 1,000 $sec^{-1}$), and the results shown in Table 1 were obtained. The rise of the melt viscosity was minor.

The pellet was supplied to an injection molding machine set at 290° to 300° C. and a test piece for evaluation of the mechanical properties was molded at a mold temperature of 150° C.

The Izod impact strength (ASTM D-256) and heat distortion temperature (ASTM D-648) determined by using the obtained test piece were as shown in Table 1. The impact strength was very high and the reduction of the heat distortion temperature was minor.

The pellet was left in a melt indexer for 30 minutes, and the retention ratio of the melt flow rate (hereinafter referred to as "MFR") was measured. The results are shown in Table 1. The MFR was determined in the same manner as specified in ASTM D-1238 except that the temperature was changed to 316° C.

COMPARATIVE EXAMPLE 1

The same PPS powder as used in Example 1 was pelletized and injection-molded without an incorporation of the ethylene/glycidyl methacrylate copolymer and the ethylene/propylene copolymer, and the Izod impact strength and heat distortion temperature of the obtained test piece were measured. The results are shown in Table 1. The impact strength was much lower than that of the test piece obtained in Example 1.

COMPARATIVE EXAMPLE 2

Pelletization, injection molding, and an evaluation were carried out in the same manner as described in Example 1, except that the PPS powder and an ethylene/glycidyl methacrylate (88/12 weight ratio) copolymer were used at a weight ratio of 80/20 instead of the PPS powder, the ethylene/glycidyl methacrylate (88/12 weight ratio) copolymer and the ethylene/propylene copolymer used at a weight ratio of 80/10/10 in Example 1. The results are shown in Table 1. The impact strength was comparable to that obtained in Example 1 of the present invention, but the melt viscosity was remarkably increased and the retention ratio of MFR was very low.

EXAMPLE 2

The same PPS powder and ethylene/glycidyl methacrylate (88/12 weight ratio) copolymer as used in Example 1 and an ethylene/butene copolymer (Tafmer A-4085 supplied by Mitsui Petrochemical) were dry-blended at a weight ratio of 60/20/20, and then the melt-kneading, pelletization, injection molding, and evaluation procedures were carried out in the same manner as described in Example 1. The results are shown in Table 1. Furthermore, the pellet was left in a melt indexer for 30 minutes, and the retention ratio of the MFR was measured, the results are shown in Table 1. The MFR was measured in the same manner as specified in ASTMD-1238 except that the temperature was changed to 316° C. under a load of 5 kg. The increase of the viscosity due to this residence was less in the composition of the present invention, and the composition of the present invention had an excellent heat stability.

COMPARATIVE EXAMPLE 3

The pelletization, injection molding, and evaluation were carried out in the same manner as described in Example 2, except that the PPS powder and an ethylene/glycidyl methacrylate (88/12 weight ratio) copolymer were used at a weight ratio of 60/40, instead of the PPS powder, the ethylene/glycidyl methacrylate (88/12 weight ratio) copolymer, and the ethylene/butene copolymer used at a weight ratio of 60/20/20 in Example 2. The results are shown in Table 1. The impact strength was comparable to that of the composition of Example 2 of the present invention, but the melt viscosity was increased and a remarkable increase of the viscosity due to the residence was observed.

COMPARATIVE EXAMPLE 4

The procedures of Example 2 were repeated in the same manner except that a maleic anhydride-modified ethylene/propylene copolymer (Tafmer MP0610 supplied by Mitsui Petrochemical) was used instead of the ethylene/butene copolymer used in Example 2. The results are shown in Table 1.

The impact strength was comparable to that of the composition of Example 2 of the present invention, but the melt viscosity was increased and a remarkable increase of the viscosity due to the residence was observed.

COMPARATIVE EXAMPLE 5

The kneading and molding were carried out in the same manner as described in Example 1, except that a styrene/butadiene rubber was used as the elastomer instead of the ethylene/propylene copolymer. The melt viscosity was higher than 50,000 poise and remarkable increases of the viscosity and gelation were observed, and thus a good injection-molded article could not be obtained.

COMPARATIVE EXAMPLE 6

The kneading and molding were carried out in the same manner as described in Example 1, except that an acrylonitrile/butadiene rubber type elastomer was used as the elastomer instead of the ethylene/propylene copolymer. A violent decomposition and gas-evolution occurred at the kneading and molding steps, and thus it was impossible to perform a stable kneading and molding.

EXAMPLES 3 THROUGH 5

About 2 kg of the powder obtained in Referential Example 1 was thrown into 20 l of NMP heated at 100° C., and the mixture was stirred for about 30 minutes and filtered. The covered solid was washed with deionized water maintained at about 90° C. and vacuum-dried at 120° C. for 24 hours to obtain a powdery product. The obtained powdery product was used in Examples 3 through 5.

The obtained PPS powder, an ethylene/glycidyl methacrylate copolymer (88/12 weight ratio) and an ethylene/ethyl acrylate copolymer (DPDJ-6182 supplied by Nippon Unicar) (Example 3), an ethylene/propylene/diene copolymer (EPDM-3045 supplied by Mitsui Petrochemical) (Example 4) or an Na salt of an ethylene/methacrylic acid copolymer (Himilan 1707 supplied by Mitsui Polychemical) (Example 5) were dry-blended at a ratio shown in Table 1. The dry blending, melt kneading, pelletization, and injection molding were carried out in the same manner as described in Example 1 to obtain a test piece. The results of the evaluation of the obtained test piece and pellet are shown in Table 1. Each test piece had an excellent impact strength and the increase of the viscosity due to the residence was small.

TABLE 1

| Example No. | Composition | | | | | | Izod impact strength | | Heat distortion temperature under high load (°C.) | Melt viscosity (poise) | MFR retention ratio after 30 minutes' residence (%) |
|---|---|---|---|---|---|---|---|---|---|---|---|
| | PPS | | Epoxy group-containing polymer | | Elastomer | | | | | | |
| | Kind | Amount (wt. %) | Kind | Amount (wt. %) | Kind | Amount (wt. %) | Notched (kg·cm/cm) | Not notched (kg·cm/cm$^2$) | | | |
| Ex. 1 | A*$^1$ | 80 | X*$^3$ | 10 | Ethylene/propylene copolymer | 10 | 61 | Above 200 | 102 | 4,200 | 90 |
| Ex. 2 | A | 60 | X | 20 | Ethylene/butene copolymer | 20 | 69 | Above 200 | 98 | 9,100 | 74 |
| Ex. 3 | B*$^2$ | 70 | X | 10 | Ethylene/ethyl acrylate copolymer | 20 | 63 | Above 200 | 100 | 4,800 | 86 |
| Ex. 4 | B | 80 | X | 5 | Ethylene/propylene/diene copolymer | 15 | 52 | Above 200 | 101 | 3,800 | 95 |
| Ex. 5 | B | 70 | X | 20 | Na salt of ethylene/methacrylic acid copolymer | 10 | 56 | Above 200 | 101 | 6,900 | 77 |
| Comp. Ex. 1 | A | 100 | — | — | — | — | 2.2 | 19 | 110 | 2,700 | 96 |
| Comp. Ex. 2 | A | 80 | X | 20 | — | — | 63 | Above 200 | 102 | 10,800 | 38 |
| Comp. Ex. 3 | A | 60 | X | 40 | — | — | 69 | Above 200 | 97 | 22,000 | 5 |
| Comp. Ex. 4 | A | 60 | X | 20 | Maleic anhydride-modified ethylene/propylene copolymer | 20 | 65 | Above 200 | 95 | 18,000 | 20 |

Note
*$^1$ A: acid treated PPS
*$^2$ B: NMP-treated PPS
*$^3$ X: ethylene/glycidyl methacrylate (88/12 weight ratio) copolymer

EXAMPLE 6

The same PPS powder and ethylene/glycidyl methacrylate (88/12 weight ratio) copolymer as used in Example 1, an ethylene/butene copolymer, and a glass fiber (chopped fiber having a length of 3 mm) were dry-blended at a weight ratio of 48/6/6/40, and the melt kneading, pelletization, and injection molding were carried out in the same manner as described in Example 1 to obtain a test piece. The physical properties of the test piece were determined, and the results are shown in Table 2. The melt viscosity of the obtained pellet was 10,300 poise (measured at 320° C. and a shear rate of 1,000 sec$^{-1}$). The MFR retention ratio measured after 30 minutes residence, in the same manner as described in Example 1, was 91%.

COMPARATIVE EXAMPLE 7

The melt kneading, pelletization, and injection molding were carried out in the same manner as described in Example 6, except that the PPS powder and the glass fiber were used at a weight ratio of 60/40 without incorporating the ethylene/glycidyl methacrylate copolymer and ethylene/butene copolymer used in Example 6. The physical properties of the obtained test piece were measured, and the results are shown in Table 2. The impact strength was much inferior to that of the composition of the present invention in which the ethylene/glycidyl methacrylate copolymer and ethylene/butene copolymer were incorporated.

COMPARATIVE EXAMPLE 8

The melt kneading, pelletization, injection molding, and evaluation were carried out in the same manner as described in Example 6, except that the PPS powder, ethylene/glycidyl methacrylate copolymer and glass fiber were used at a weight ratio of 48/12/40, instead of the PPS powder, glycidyl methacrylate copolymer, ethylene/butene copolymer, and glass fiber, used at a weight ratio of 48/6/6/40 in Example 6. The results are shown in Table 2.

The melt viscosity of the obtained pellet was 23,000 poise, and the MFR retention ratio after 30 minutes residence was 33%. The viscosity increase after the residence was much larger than in Example 6 of the present invention, and the composition had an inferior heat stability compared to the composition Example 6.

EXAMPLE 7

The melt kneading, pelletization and injection molding were carried out in the same manner as described in Example 6, except that an ethylene/glycidyl methacrylate copolymer (94/6 weight ratio) was used instead of the ethylene/glycidyl methacrylate (88/12 weight ratio) copolymer. The physical properties of the obtained test piece were evaluated, and the results are shown in Table 2.

EXAMPLES 8 THROUGH 10

The same PPS powder and ethylene/glycidyl methacrylate (88/12 weight ratio) copolymer as used in Example 1, a glass fiber, and an ethylene/propylene copolymer (Example 8), an ethylene/propylene/diene copolymer (Example 9) or an ethylene/ethyl acrylate copolymer (Example 10) were melt-kneaded at a ratio shown in Table 2 and pelletized and injection-molded in the same manner as described in Example 1, to obtain a test piece. The results of an evaluation of the physical properties of the obtained test piece are shown in Table 2.

EXAMPLE 11

The PPS (Ryton PR-06 supplied by Phillips Petroleum), an ethylene/glycidyl methacrylate (88/12 weight ratio)

copolymer, a glass fiber, and a styrene/ethylene/butadiene block copolymer (SEBS) were melt-kneaded at a ratio shown in Table 2 and pelletized and injection-molded in the same manner as described in Example 1 to obtain a test piece. The results of an evaluation of the physical properties of the test piece are shown in Table 2.

water at room temperature and dried under a reduced pressure at 120° C. for 24 hours to obtain about 2 kg of powdery PPS. The obtained powder was used in Examples 12 through 17.

The obtained PPS powder, an ethylene/glycidyl methacrylate copolymer (88/12 weight ratio), and an ethylene/

TABLE 2

| Example No. | Composition | | | | | | Izod impact strength | | Heat distortion temperature under high load (°C.) |
|---|---|---|---|---|---|---|---|---|---|
| | PPS | | Epoxy group-containing polymer | | Elastomer | | Amount of glass fiber (wt. %) | Notched (kg · cm/cm) | Not notched (kg · cm/cm²) |
| | Kind | Amount (wt. %) | Kind | Amount (wt. %) | Kind | Amount (wt. %) | | | |
| Ex. 6 | A*1 | 48 | X*3 | 6 | Ethylene-butene copolymer | 6 | 40 | 18 | 67 | 259 |
| Ex. 7 | A | 48 | Y*5 | 6 | Ethylene-butene copolymer | 6 | 40 | 17 | 58 | 259 |
| Ex. 8 | A | 42 | X | 6 | Ethylene-propylene copolymer | 12 | 40 | 19 | 68 | 256 |
| Ex. 9 | A | 52 | X | 4 | Ethylene/propylene/diene copolymer | 4 | 40 | 16 | 55 | 260 |
| Ex. 10 | A | 54 | X | 3 | Ethylene/ethyl acrylate copolymer | 3 | 40 | 15 | 52 | 262 |
| Ex. 11 | C*4 | 56 | X | 9 | SEBS | 5 | 30 | 15 | 50 | 257 |
| Comp. Ex. 7 | A | 60 | — | — | — | — | 40 | 9 | 31 | 263 |
| Comp. Ex. 8 | A | 48 | X | 12 | — | — | 40 | 18 | 68 | 258 |

Note
*1 A: acid-treated PPS
*3 X: ethylene/glycidyl methacrylate (88/12 weight ratio) copolymer
*4 C: Ryton PR-06 supplied by Phillips Petroleum
*5 Y: ethylene/glycidyl methacrylate (94/6 weight ratio) copolymer

EXAMPLES 12 THROUGH 17

The polymerization was carried out in the same manner as described in Referential Example 1, and the obtained reaction mixture was cooled to 100° C. and added into water while stirring, followed by filtration. The recovered product was washed five times with warm water maintained at 70° C. The washed product and 10 l of deionized water were charged in an autoclave, the autoclave was sealed, and the temperature was elevated to 170° C. while stirring. This temperature was maintained for 30 minutes, and the charge in the autoclave was cooled, taken out from the autoclave, and filtered. The recovered solid was washed with deionized butyl acrylate copolymer (Example 12), an ethylene/propylene copolymer (Example 13), an ethylene/butene copolymer (Example 14) or a polyamide elastomer (Example 15), optionally together with a glass fiber (Examples 16 through 18), were mixed at a ratio shown in Table 3 and melt-kneaded, pelletized, and injection-molded in the same manner as described in Example 1, to obtain a test piece. The results of an evaluation of the physical properties of the obtained test piece are shown in Table 3.

TABLE 3

| Example No. | Composition | | | | | | Izod impact strength | | Heat distortion temperature under high load (°C.) |
|---|---|---|---|---|---|---|---|---|---|
| | PPS | | Epoxy group-containing monomer | | Elastomer | | Amount of glass fiber (wt. %) | Notched (kg · cm/cm) | Not notched (kg · cm/cm²) |
| | Kind | Amount (wt. %) | Kind | Amount (wt. %) | Kind | Amount (wt. %) | | | |
| Ex. 12 | D*6 | 80 | X*3 | 10 | Ethylene/butyl acrylate | 10 | — | 59 | Above 200 | 103 |
| Ex. 13 | D | 60 | X | 20 | Ethylene/propylene copolymer | 20 | — | 67 | Above 200 | 98 |
| Ex. 14 | D | 70 | X | 10 | Ethylene/butene copolymer | 20 | — | 64 | Above 200 | 101 |

TABLE 3-continued

| | Composition | | | | | Izod impact strength | | Heat distortion temperature |
|---|---|---|---|---|---|---|---|---|
| | PPS | | Epoxy group-containing monomer | | Elastomer | | Amount of glass | | | under high |
| Example No. | Kind | Amount (wt. %) | Kind | Amount (wt. %) | Kind | Amount (wt. %) | fiber (wt. %) | Notched (kg · cm/cm) | Not notched (kg · cm/cm²) | load (°C.) |
| Ex. 15 | D | 70 | X | 15 | Polyamide elastomer*⁷ | 15 | — | 61 | Above 200 | 102 |
| Ex. 16 | D | 42 | X | 6 | Ethylene/butyl acrylate copolymer | 12 | 40 | 20 | 67 | 255 |
| Ex. 17 | D | 48 | X | 6 | Ethylene/propylene copolymer | 6 | 40 | 17 | 54 | 258 |
| Ex. 18 | D | 48 | X | 6 | Ethylene/butene copolymer | 6 | 40 | 18 | 56 | 259 |

Note
*³ X: ethylene/glycidyl methacrylate (88/12 weight ratio) copolymer
*⁶ D: hot water-treated PPS
*⁷ "PEBAX 4011" supplied by ATO

EXAMPLE 19

The acid-washed PPS used in Example 1, an ethylene/glycidyl methacrylate (88/12 weight ratio) copolymer, and an ethylene/propylene copolymer (Tafmer P-180) were dry-blended at a weight ratio of 80/10/10, and the blend was supplied to a twin-screw extruder having a diameter of 30 mm, melt-kneaded at 320° C., and pelletized by a pelletizer. The obtained pellet was air-dried at 80° C. for 3 hours, supplied to an extruder heated at 295° C., which had an opening diameter of 45 mm and an L/D ratio of 23, extruded in the form of a cylinder through a die for molding a tube, by the inner pressure method at a shear rate of 8 sec$^{-1}$, and cooled in water at 10° C. through a sizing plate to obtain a tube having a good appearance, an outer diameter of 8.0 mm, and an inner diameter of 6.0 mm. Separately, a part of the pellet was molded at a cylinder temperature of 310° C. and a mold temperature of 130° C. by using an in-line screw type injection molding machine, to obtain a test piece.

The characteristic properties of the obtained tube and test piece were as shown below. It was confirmed that a tube having a good heat resistance, softness, impact resistance, and chemical resistance, and a very high practical utility, was obtained.

Physical Properties

Flexural strength: 690 kg/cm²

Flexural elastic modulus: 17,900 kg/cm²

Impact resistance*: 5%

Chemical resistance**: 3%

Heat distortion temperature (18.6 kg/cm²): 103° C.

*: A weight of 5.33 kg was allowed to fall on the tube from a height of 1 m. This test was conducted on 20 samples and the fracture ratio was determined.

**: A press sheet having a size of 40 mm×40 mm ×0.2 mm was molded and immersed in lubricating oil No. 3, and was treated at 100° C. for 70 hours. The increase of the weight of the sheet was determined.

EXAMPLE 20

The same PPS (A) as used in Example 1, an ethylene/glycidyl methacrylate (88/12 weight ratio) copolymer, an ethylene/propylene copolymer rubber "Tafmer" P0680 supplied by Mitsui Petrochemical), and a glass fiber were dry-blended at a weight ratio of 65/10/10/15, and the blend was melt-kneaded and pelletized by a single screw extruder having a screw diameter of 65 mm and set at 320° C., at a screw revolution of 40 rpm. The thus-prepared pellet had an apparent viscosity of 25,000 poise at 320° C. and a shear rate of sec.$^{-1}$. The pellet was dryed by hot air at 130° C. for 3 hours and blow-formed by using the above-mentioned blow-forming machine to obtain a container having a shape of an equilateral square prism having a 150 mm×150 mm×500 mm size. The parison thereof exhibited a small drawdown and the blow-formed container had a good surface appearance. The properties of the container were determined by the following procedures and the results are shown in Table 4.

(1) Shapability

A pellet specimen was subjected to blow-forming by using a blow-forming machine equipped with an extruder having a 50 mm diameter at a cylinder temperature of 320° C. to obtain a parison having an outer diameter of 100 mm and a wall thickness of 4 mm. Air was blown into the parison placed within a mold to form a container having an equilateral square prism having a 150 mm×150 mm×500 mm size. The wall thickness of the square prism was measured on five points in each of the upper half portion of the pillar thereof and the lower half portion of the pillar thereof. When the difference between the average wall thickness of the upper half portion and the average wall thickness of the lower half portion is 1 mm or less, the shapability is evaluated as good. In contrast, when this difference is larger than 1 mm, the shapability is evaluated as poor.

(2) Heat resistance

A weight of 2.5 kg is loaded on the pillar portion of the prism at a certain temperature for one hour, and the highest temperature at which the deformation of the pillar portion of the prism can be maintained at a value of 2 mm or smaller was measured. The heat resistance is expressed in terms of the highest temperature.

(3) Impact resistance

The prism specimen is allowed to fall on a concrete floor from a height of 1 m and the fracture of the specimen and the occurrence of cracks are observed by the naked eyes. This falling test is conducted on 20 specimens and the impact resistance is expressed by the following non-fracture ratio.

$$\text{The non-fractured ratio (\%)} = \frac{\text{The number of non-fractured specimens}}{20} \times 100$$

COMPARATIVE EXAMPLE 9

A composition comprised of 85% by weight of the same PPS (A) as used in Example 1 and 15% by weight of a glass fiber (which composition is different from that used in Example 20 in that the ethylene/glycidyl methacrylate copolymer and the ethylene/propylene rubber were not contained therein) was melt-kneaded, pelletized and then subjected to blow-forming by the same procedures as employed in Example 20. The parison thereof exhibited an undesirably large drawdown and the blow-formed container had an uneven wall thickness and a poor heat resistance and impact resistance.

EXAMPLE 21

A composition comprised of 60% by weight of the same PPS(D) prepared in Example 12, 10% by weight of the same ethylene/glycidyl methacrylate copolymer as used in Example 1, 10% by weight of an ethylene/butene-1 copolymer ("Tafmer" A4085 supplied by Mitsui Petrochemical), and 20% by weight of a glass fiber was melt-kneaded, pelletized and then blow-formed into a container by the same procedures as employed in Example 20. The parison thereof exhibited a small draw drawn and the blow-formed container had a good surface appearance. The properties of the container are shown in Table 4. As seen from Table 4, the container had a good shapability (i.e., uniformity in wall thickness), heat resistance and impact resistance.

TABLE 4

|  |  | Example 20 | Comparative Example 9 | Example 21 |
|---|---|---|---|---|
| Kind of PPS |  | A*1 | A*1 | D*2 |
| Amount of PPS | (wt. %) | 65 | 85 | 60 |
| Kind of olefin copolymer |  | B-1*3 | — | B-1*3 |
| Amount of olefin copolymer | (wt. %) | 10 | — | 10 |
| Kind of elastomer |  | E-1*4 | — | E-2*5 |
| Amount of elastomer | (wt. %) | 10 | — | 10 |
| Reinforcer |  | Glass fiber | Glass fiber | Glass fiber |
| Amount of reinforcer | (wt. %) | 15 | 15 | 20 |
| Appearance of blow-formed article |  | good | poor | good |
| Shapability (uniformity in wall thickness) |  | Good | Poor | Good |
| Heat resistance | (°C.) | 180 | 110 | 175 |
| Impact resistance (non-fracture ratio) | (%) | 100 | 0 | 100 |

Note
*1 Acid-treated PPS
*2 Hot water-treated PPS
*3 Ethylene/glycidyl methacrylate (88/12 weight ratio) copolymer
*4 Ethylene/propylene rubber ("Tafmer" P0680 supplied by Mitsui Petrochemical)
*5 Ethylene/butene rubber ("Tafmer" A4085 supplied by Mitsui Petrochemical)

What is claimed is:

1. A shaped article made by melt-shaping a polyphenylene sulfide composition comprising (A) a polyphenylene sulfide, (B) a copolymer of an α-olefin with a glycidyl ester of an α,β-unsaturated acid, and (C) at least one elastomer selected from the group consisting of ethylene/propylene copolymers, ethylene/butene copolymers, ethylene/propylene/diene terpolymers, hydrogenated styrene/butadiene/styrene block copolymers, copolymers of ethylene with a monomer selected from the group consisting of acrylic acid, alkyl esters of acrylic acid, metal salts of acrylic acid, methacrylic acid, alkyl esters of methacrylic acid, metal salts of methacrylic acid, and polyamide elastomers which are block copolymers having hard segments of a polyamide component and soft segments of at least one component selected from the group consisting of polyether components and polyester components.

2. A shaped article as set forth in claim 1 wherein the melt-shaping is carried out by injection-molding the polyphenylene sulfide composition.

3. A shaped article as set forth in claim 1 wherein the melt-shaping is carried out by extrusion-molding the polyphenylene sulfide composition.

4. A shaped article as set forth in claim 3 which is in a tubular form.

5. A shaped article as set forth in claim 1 wherein the melt-shaping is carried out by blow-forming the polyphenylene sulfide composition.

6. A shaped article as set forth in claim 1 wherein said polyamide component is selected from the group consisting of $-(NH-R^I-CO)_{\overline{n}}$ and $-(NH-R^{II}-NH\ CO-R^{III}-CO)_{\overline{n}}$, in which $R^I$, $R^{II}$ and $R^{III}$ represent an alkylene group having 2 to 15 carbon atoms or a substitution product thereof and n is a positive integer.

7. A shaped article as set forth in claim 1 wherein said polyether component is $-(OR)_{\overline{n}}$ in which R represents an alkylene group having 2 to 15 carbon atoms or a substitution product thereof and n is a positive integer.

8. A shaped article as set forth in claim 1 wherein said polyester component is selected from the group consisting of $-(OR^I-CO)_{\overline{n}}$ and $-(OR^{II}-OCO-R^{III}-CO)_{\overline{n}}$, in which $R^I$, $R^{II}$ and $R^{III}$ represent an alkylene group having 2 to 15 carbon atoms or a substitution product thereof and n is a positive integer.

9. A shaped article as set forth in claim 1 wherein the mixing ratio of components (A), (B) and (C) is within a ratio such that the (A)/((B) and (C)) weight ratio is from 55/45 to 99/1 and the (B)/(C) weight ratio is from 5/95 to 95/5.

10. A shaped article made by melt-shaping a polyphenylene sulfide composition comprising (A) a polyphenylene sulfide, (B) a copolymer of an α-olefin with a glycidyl ester of an α,β-unsaturated acid and (C) at least one elastomer selected from the group consisting of ethylene/propylene copolymers, ethylene/butene copolymers, ethylene/propylene/diene terpolymers, hydrogenated styrene/butadiene/styrene block copolymers and copolymers of ethylene with a monomer selected from the group consisting of acrylic acid, alkyl esters of acrylic acid, metal salts of acrylic acid, methacrylic acid, alkyl esters of methacrylic acid and metal salts of methacrylic acid.

11. A shaped article as set forth in claim 10 wherein the mixing ratio of components (A), (B) and (C) is within a ratio such that the (A)/((B) and (C)) weight ratio is from 55/45 to 99/1 and the (B)/(C) weight ratio is from 5/95 to 95/5.

12. A shaped article made by melt-shaping a polyphenylene sulfide composition comprising (A) a polyphenylene sulfide, (B) a copolymer of α-olefin with a glycidyl ester of an α,β-unsaturated acid and (C) at least one elastomer selected from the group consisting of polyamide elastomers, ethylene/propylene copolymers, ethylene/butene copolymers, ethylene/propylene/diene terpolymers, hydrogenated styrene/butadiene/styrene block copolymers and copolymers of ethylene with a monomer selected from the group consisting of acrylic acid, alkyl esters of acrylic acid, metal salts of acrylic acid, methacrylic acid, alkyl esters of methacrylic acid and metal salts of methacrylic acid, said polyamide elastomers being block copolymers having hard segments of a polyamide component selected from the group consisting of $(-NH-R^I-CO-)_n$ and $(-NH-R^{II}-NHCO-R^{III}-CO-)_n$ in which $R^I$, $R^{II}$ and $R^{III}$ are alkylene groups of 2 to 15 carbon atoms or a substitution product thereof and n is a positive integer, and soft segments of at least one component selected from the group consisting of polyether components and polyester components, the polyether component comprising the formula $(-OR-)_n$ in which R is an alkylene group of 2 to 15 carbon atoms or a substitution product thereof and n is a positive integer, and the polyester component selected from the group consisting of $(-OR^I-CO-)_n$ and $(-O-R^{II}-OCO-R^{III}-O-)_n$ in which $R^I$, $R^{II}$ and $R^{III}$ are alkylene groups of 2 to 15 carbon atoms or a substitution product thereof and n is a positive integer, and wherein the mixing weight ratio among the polyphenylene sulfide (A), the copolymer of α-olefin with a glycidyl ester of an α,β-unsaturated acid (B) and the elastomer (C) is within a ratio such that the (A)/((B)+(C)) weight ratio is from 55/45 to 99/1 and the (B)/(C) weight ratio is from 5/95 to 95/5.

* * * * *